US007341185B1

(12) United States Patent
Arrington et al.

(10) Patent No.: US 7,341,185 B1
(45) Date of Patent: Mar. 11, 2008

(54) METHOD OF MARKING AND MONITORING PRODUCTS AT A SELF-SERVICE CHECKOUT TERMINAL

(75) Inventors: Stacy L. Arrington, Raleigh, NC (US);
Sharon C. Freedman, Cary, NC (US);
Hye S. Makley, Raleigh, NC (US);
Tracy C. Payne, Raleigh, NC (US);
Kimberly A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/927,919

(22) Filed: Oct. 30, 2007

(51) Int. Cl.
*G06K 15/00* (2006.01)

(52) U.S. Cl. .......................... 235/383; 705/16; 705/23; 340/568.1; 340/572.1

(58) Field of Classification Search ................ 235/383, 235/385, 462.14; 705/16, 23, 24; 186/52, 186/59, 61; 340/5.1, 5.9, 5.92, 568.1, 568.5
See application file for complete search history.

(56) References Cited

U.S. PATENT DOCUMENTS

| 4,084,742 A | 4/1978 | Silverman |
| 4,529,871 A | 7/1985 | Davidson |
| 5,884,425 A | 3/1999 | Baldwin |
| 6,325,290 B1 | 12/2001 | Walter |
| 6,327,972 B2 * | 12/2001 | Heredia et al. ................ 101/35 |
| 6,783,072 B2 * | 8/2004 | Acosta et al. ................ 235/454 |
| 7,049,962 B2 * | 5/2006 | Atherton et al. ......... 340/572.1 |
| 2004/0220860 A1 | 11/2004 | Persky |
| 2005/0218219 A1 * | 10/2005 | Sano et al. .................. 235/383 |
| 2006/0221363 A1 * | 10/2006 | Roth et al. ............... 340/572.1 |
| 2007/0069895 A1 * | 3/2007 | Koh ........................ 340/572.1 |

* cited by examiner

*Primary Examiner*—Jared J. Fureman
(74) *Attorney, Agent, or Firm*—Cantor Colburn LLP; Jason O. Piche

(57) ABSTRACT

A method of marking products purchased through a self-service checkout terminal includes scanning a product to be purchased into a computer and issuing a tamper resistant label from a printer at the self-service checkout terminal. The tamper resistant label includes a visual indicator including product data section, and a radio frequency identifier including product data portion. The method also includes adhesively bonding the tamper resistant label to the product scanned into the computer such that removal of the tamper resistant label from the product destroys the product data section of the visual indicator and the radio frequency identifier. Finally, the method includes scanning for each of the visual indicator and the radio frequency identifier after the product passes through the self-service checkout terminal to verify that the product was scanned into the computer.

4 Claims, 3 Drawing Sheets

METHOD OF MARKING AND MONITORING PRODUCTS AT A SELF-SERVICE CHECKOUT TERMINAL

BACKGROUND OF THE INVENTION

Field of the Invention

The present invention pertains to the art of retail sales check-out terminals and, more particularly, to a system for marking products passing through a self-service checkout terminal.

DESCRIPTION OF BACKGROUND

Conventionally, retail stores employ checkout terminals manned by a store employee, e.g., cashier. The store employee scans each item to be purchased by a customer. During checkout, often times the cashier will ask the customer if there are any large under-cart items that require scanning. If so, the cashier will typically use a hand-held scanner to scan the large item. Once all items are scanned, a total is calculated, the customer pays and carries the purchased items from the store. Recently, in order to reduce costs and checkout times, many retail stores have installed self-service checkout terminals.

A self-service checkout terminal allows a customer to scan and pay for items without the aid of a cashier. When large under-cart items are present, the customer employs the hand-held scanner to validate a purchase. In some cases, once hand scanning is complete, a "paid" label is printed, and the customer is prompted to affix the label to the large item. Often times, a customer will accidentally neglect to scan a large under-cart item and head towards a store exit. In order to mitigate product losses, many stores employ a security person that performs a visual scan to ensure that all under-the-carts items have a paid label. In some cases, a dishonest customer will simply neglect to scan an item and attempt to leave the store, or will swap a paid label from one item to another, generally more expensive item. In any case, it is difficult to monitor all carts and all customers exiting a store, particularly during high volume sales periods.

SUMMARY OF THE INVENTION

The shortcomings of the prior art are overcome and additional advantages are provided through the provision of a method of marking products purchased through a self-service checkout terminal. The method includes scanning a product to be purchased into a computer and issuing a tamper resistant label from a printer at the self-service checkout terminal. The tamper resistant label includes a visual indicator including product data section, and a radio frequency identifier programmed at the self-service checkout terminal with a product data portion. The method also includes adhesively bonding the tamper resistant label to the product scanned into the computer such that removal of the tamper resistant label from the product destroys the product data section of the visual indicator and the radio frequency identifier. Finally, the method includes scanning for each of the visual indicator and the radio frequency identifier after the product passes through the self-service checkout terminal to verify that the product was scanned into the computer.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION OF THE INVENTION

Figure 1:
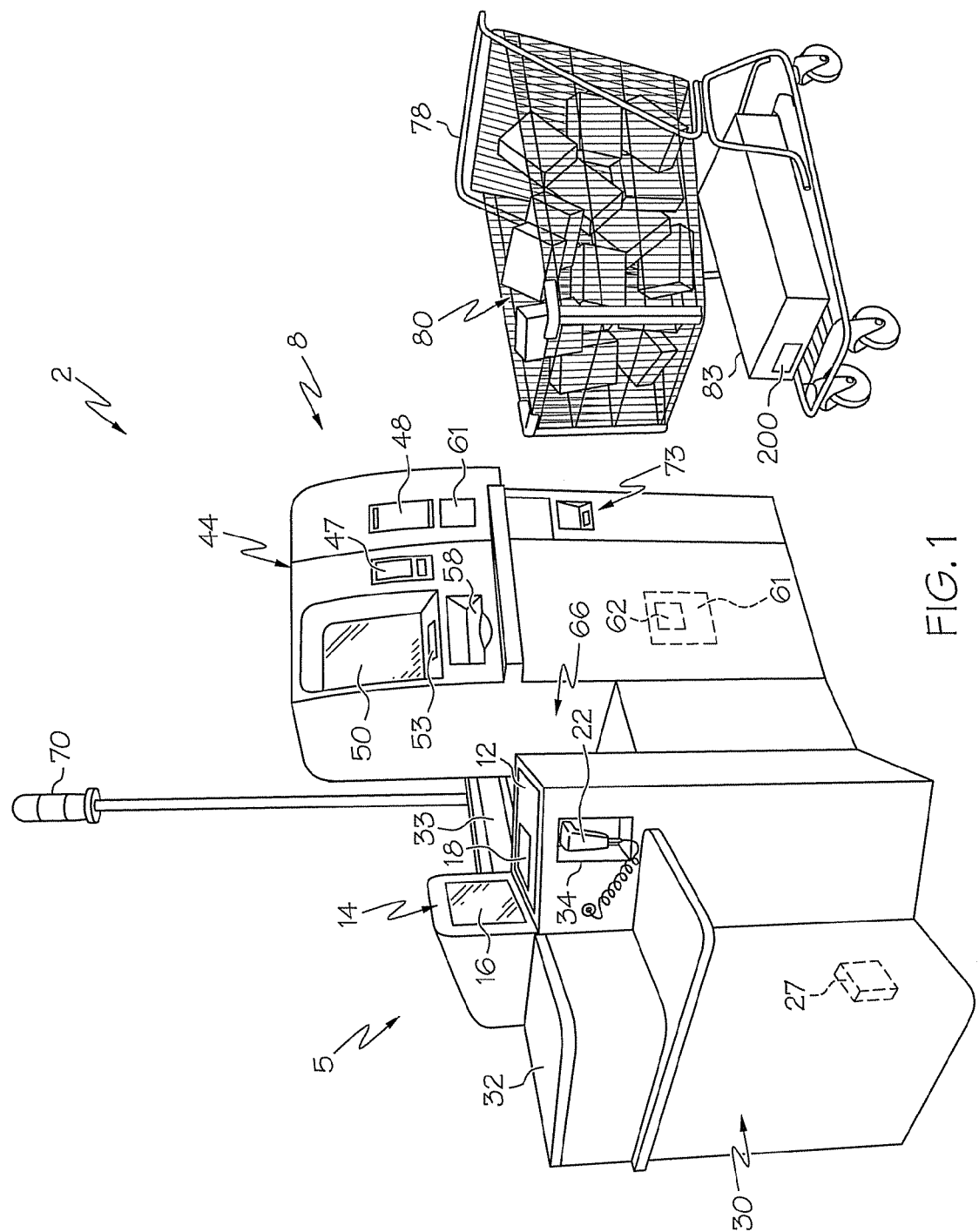
FIG. 1 illustrates one example of a self-service checkout terminal including an apparatus for dispensing tamper resistant monitoring labels in accordance with an exemplary embodiment of the invention.

Turning now to the drawings in greater detail, it will be seen that in FIG. 1 there is shown a self-service checkout terminal indicated generally at 2. Checkout terminal 2 includes a product scanning portion 5 and a user interface portion 8. Product scanning portion 5 includes a product scale 12, a stationary scanner 14 having a vertical scanning surface 16 and a horizontal scanning surface 18, and a hand-held scanner 22. Stationary scanner 14 and hand-held scanner 22 scan or read product identification codes, such as Universal Product Code (UPC), industrial symbol(s), alpha-numeric character(s) or other indicia associated with items to be purchased. In addition, product scanning portion 5 includes a radio frequency detector 27 that is employed to scan radio frequency identification (RFID) tags as will become more fully evident below. Scanner portion 5 is further shown to include a housing 30 having first and second counter surfaces 32 and 33, and a holder 34 that serves as a housing for hand-held scanner 22.

User interface portion 8 includes a housing 44 having a card reader 47, a bill acceptor/validator 48, a display monitor 50, a keypad 53, a receipt printer 55 for printing receipts, and a change well 58 for selectively returning change to customers upon completion of a purchase transaction. User interface 8 further includes a computer 61 including a database 62 having stored therein product information. A bag well 66 is interposed between scanner portion 5 and user interface portion 8. Self-service checkout terminal 2 is also shown to include a status light 70 that signals customers that terminal 2 is open or store personnel that help is required. Finally, user interface portion 8 is shown to include a printer 73 that selectively outputs tamper resistant monitoring labels or tags as will be discussed more fully below.

During a transaction, a customer approaches self-service checkout terminal 2 with a shopping cart, such as indicated at 78, full of various items/products indicated generally at 80. In addition to items 80, often times a customer will purchase a large or bulk item, such as shown at 83, that is stored underneath cart 78. During the transaction, the customer scans each of items 80 through stationary scanner 14. The scan queries computer 61 for product information associated with the scanned product stored in database 62. The product information is then stored in computer 61 as part of a list of purchased products associated with the instant transaction. The product information is also sent to display monitor 50, which displays the price so that it may be seen by the customer. In addition, the price and product information are sent to receipt printer 55 where a cash receipt containing a list of all products purchased, their associated prices together with a total is printed upon completion of the transaction. The receipt also usually contains an identification of the store, date of purchase, a record of the cash offered by the customer, change due, credits due, and any applicable taxes. In any event, once payment is received, and the receipt validating the purchase is printed, the customer exits the store with their purchases.

Figure 2:
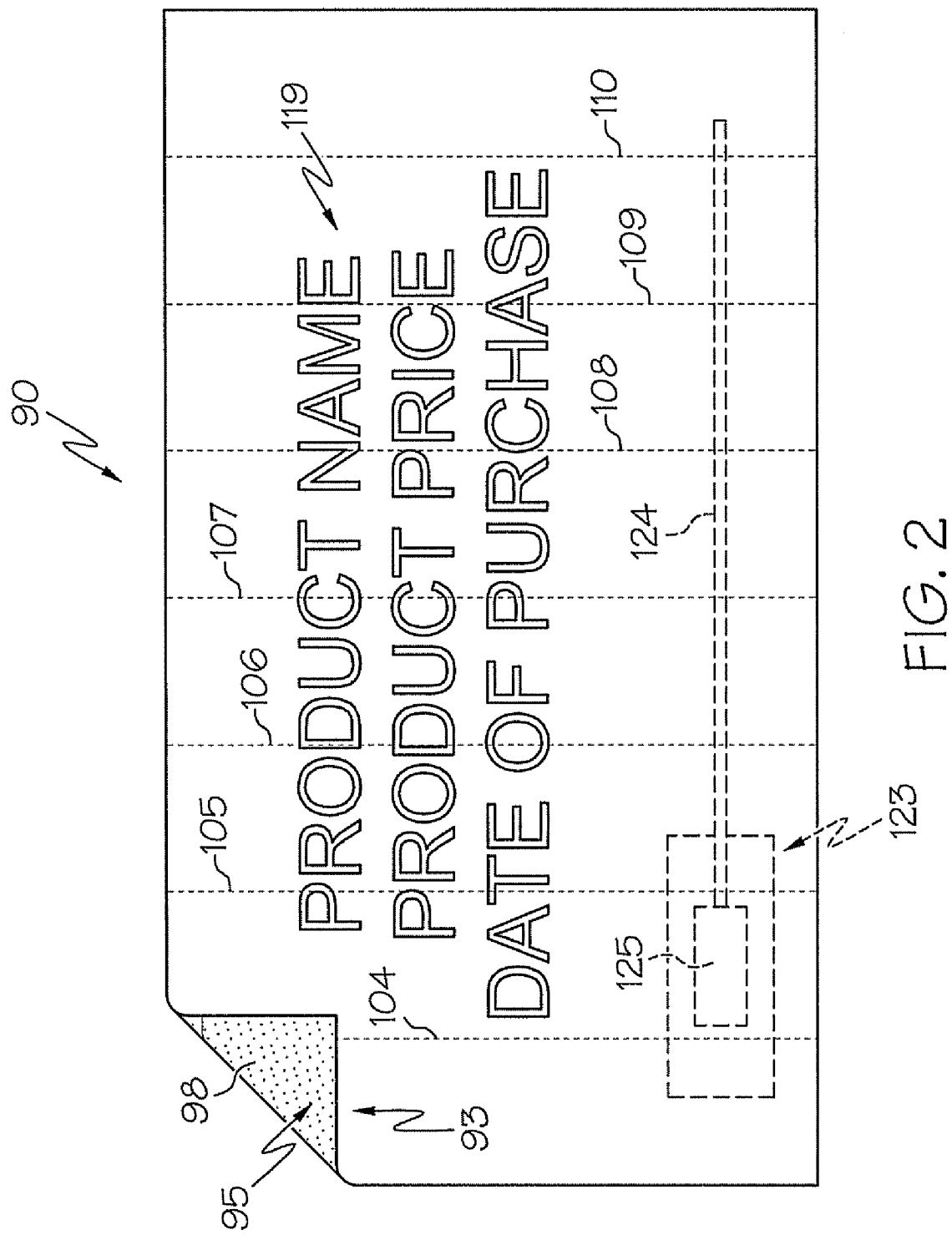
FIG. 2 illustrates a tamper resistant monitoring label in accordance with an exemplary embodiment of the invention.

If the customer has purchased a large or bulk item, scanning is performed via hand-held scanner 22. Oftentimes however, a customer will either accidentally, or intentionally neglect to scan a large under-cart item and attempt to leave the store without paying. In order to minimize product losses, many stores position store employees to monitor a group of self-service checkout terminals. The store employees offer help with the scanning process while at the same time keeping a weather eye for under-cart items that may not have been scanned to ensure that each product is purchased. Oftentimes, the customer is provided with a label to mark the bulk item. The label aids the store employee in differentiating between items that have been scanned and purchased and those items that have not been scanned. Unfortunately, during high volume sales periods store employees may be busy assisting customers with their purchases. During these times, an unscrupulous customer may try to take advantage of the employee's low level of vigilance and attempt to sneak a product from the store. In other cases, the unscrupulous customer will remove a label from a scanned item to place on an oftentimes more expensive not scanned item. In order to address this concern the present invention provides a tamper resistant monitoring label 90 such as shown in FIG. 2.

Label 90 includes a first or outer surface 93 and a second or adhesive surface 95 including a semi-permanent adhesive 98. Label 90 also includes a plurality of score lines 104 through 110 that are designed to tear if a customer attempts to remove label 90 from a scanned product. In addition, label 90 is provided with a striking visual indicator such as a fluorescent color, or reflective surface to draw the attention of store employees or security personnel. The visual indicator also includes a product data section 119 including product data such as product name, product price, and date of purchase. Finally, label 90 is provided with a radio frequency identification device 123 having an antenna 124 that extends across label 90. Radio frequency identification device 123, also includes a product data portion 125 programmed with product data, e.g., product name product price and purchase date, at self-service checkout terminal 2 when a product is scanned by hand-held scanner 22. In this manner, store personnel are not only provided with a visual indicator to ensure that large or under-cart items have been scanned into computer 61 and purchased, but also with a radio frequency identifier that can be scanned by, for example radio frequency detector 27 to aid in minimizing product losses as will be discussed more fully below.

Figure 3:
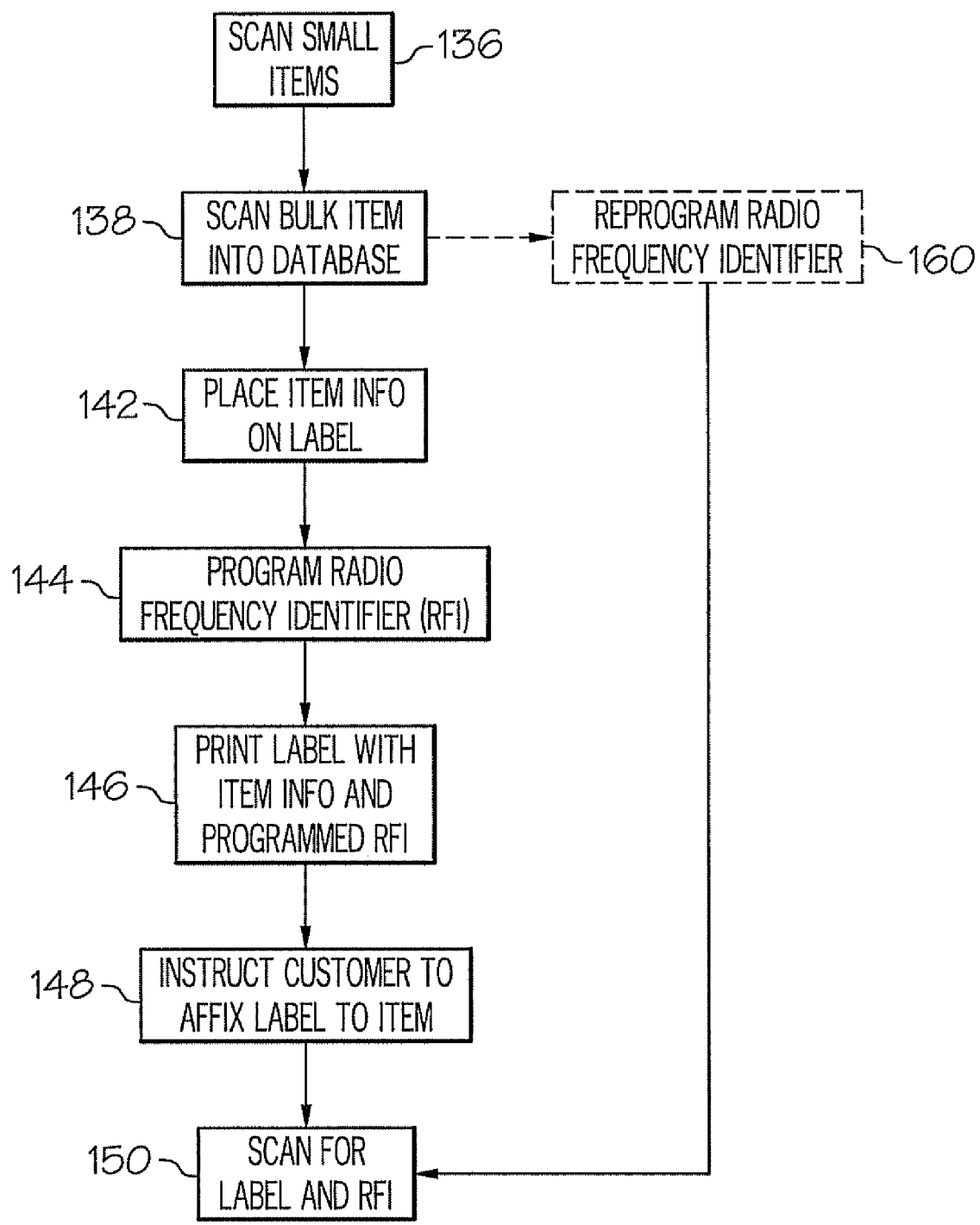
FIG. 3 is a flow diagram illustrating one example of a method of marking and monitoring products at a self-service checkout terminal in accordance with an exemplary embodiment of the invention.

In accordance with an exemplary embodiment of the invention, upon approaching self-service checkout terminal 2, a customer scans bar codes affixed to each item 80 in shopping car 78. The bar codes contain product information that is entered into computer 61—to be stored in a transaction database as indicated in block 136 in FIG. 3. If under-cart items are present, the customer uses hand-held scanner 22 to scan the corresponding bar code as indicated in block 138. Once the under-cart or large item is scanned, computer 61 initiates printing product data section 119 on label 90 as indicated in block 142. Computer 61 also programs product data portion 125 of radio frequency identifier device 123 as indicated at block 144. Once product section 119 is printed, and radio frequency identification device 123 is programmed, printer 73 dispenses tamper resistant label 90 as indicated in block 146. At this point, a visual and/or audible prompt is presented requesting that the customer affix tamper resistant label 90 to the scanned under-cart or large item as indicated in block 148. Once the transaction is complete, and the consumer exits, store personnel visually and electronically monitor each time bearing a tamper resistant product monitoring label 90. Any attempts to remove label 90 from a scanned product will destroy product data section and antenna 124 and by extension, product data portion 125.

In accordance with another aspect of the invention, in the event that a particular item already includes a radio frequency identifying tag RFID tag, such as indicated at 200, after scanning an under-cart item into database 62 in block 138, computer 61 reprograms radio frequency identifying tag 200 as indicated in block 160 as an added measure of security. More specifically, oftentimes certain products are provided with a radio frequency identifier or tag for inventory control purposes. The exemplary embodiment reprograms the existing inventory control radio frequency identifier to indicate that the associated item has been scanned into database 62. In this manner, in the event that a customer fails to scan a product having an existing radio frequency identifier, radio frequency monitoring device 27 is employed to scan for signals from both label 90 and RFID tag 200 to further ensure that each item has been scanned into database 62 and purchased by the customer.

At this point, it should be appreciated that the present invention provides for a simple, cost-effective method of inventory control to ensure bulk products are properly, permanently and conspicuously marked as being purchased through a self-service check-out terminal. In this manner, store personnel are provided with multiple opportunities, both active, i.e., visual scanning of carts and passive, i.e., electronic scanning, to scan for marked products, to ensure that every item, particularly large under-cart items, exiting the store has been purchased by the customer.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of marking and monitoring products purchased through a self-service checkout terminal, the method comprising:

scanning a product to be purchased into a computer;

issuing a tamper resistant label from a printer at the self-service checkout terminal, the tamper resistant label including a visual indicator including a product data section and a radio frequency identifier (RFID) including a product data portion;

adhesively bonding the tamper resistant label to the product scanned into the computer, wherein removal of the tamper resistant label from the product destroys both the product data section of the visual indicator and the radio frequency identifier; and scanning for each of the visual indicator and the radio frequency identifier after the product passes through the self-service checkout terminal to verify that the product was scanned into the computer.

2. The method according to claim 1, further comprising: reprogramming a product inventory radio frequency identifier attached to the product prior to being scanned to indicate that the product was scanned into the computer.

3. The method of claim 2, further comprising: scanning for the product inventory radio frequency identifier reprogrammed to indicate that the product was scanned into the computer after the product passes through the self-service checkout terminal.

4. The method of claim 1, further comprising: providing score lines on the tamper resistant label to facilitate destruction of the product data portion of the visual indicator and the radio frequency identifier when the tamper resistant label is removed from the product scanned into the computer.

* * * * *